(12) United States Patent
Ueno

(10) Patent No.: US 12,534,110 B2
(45) Date of Patent: Jan. 27, 2026

(54) MOTION MANAGER, AUTONOMOUS DRIVING APPARATUS, AND CONTROL SYSTEM

(71) Applicant: TOYOTA JIDOSHA KABUSHIKI KAISHA, Toyota (JP)

(72) Inventor: Hiroshi Ueno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 321 days.

(21) Appl. No.: 17/976,980

(22) Filed: Oct. 31, 2022

(65) Prior Publication Data
US 2023/0166772 A1 Jun. 1, 2023

(30) Foreign Application Priority Data
Nov. 30, 2021 (JP) ................................. 2021-194275

(51) Int. Cl.
*B60W 60/00* (2020.01)
*B60W 50/08* (2020.01)

(52) U.S. Cl.
CPC ........ *B60W 60/005* (2020.02); *B60W 50/082* (2013.01)

(58) Field of Classification Search
CPC .......................... B60W 60/005; B60W 50/082
See application file for complete search history.

(56) References Cited

U.S. PATENT DOCUMENTS

| | | | | |
|---|---|---|---|---|
| 8,577,579 B2* | 11/2013 | Grolle | ................. | B60W 30/143 701/1 |
| 2011/0066344 A1* | 3/2011 | Niwa | .................. | B60W 10/184 701/70 |
| 2014/0249721 A1* | 9/2014 | Schindler | .............. | B60W 10/04 701/41 |
| 2014/0336897 A1* | 11/2014 | Nordbruch | .......... | B60W 30/182 701/93 |
| 2015/0019042 A1* | 1/2015 | Poechmueller | ... | B60W 50/0098 701/1 |
| 2015/0042151 A1* | 2/2015 | Zimmermann | ....... | B60T 8/3275 303/3 |
| 2017/0190354 A1* | 7/2017 | Ko | ...................... | B60W 30/165 |
| 2018/0284774 A1* | 10/2018 | Kawamoto | ....... | B60W 50/0098 |

(Continued)

FOREIGN PATENT DOCUMENTS

| | | |
|---|---|---|
| CN | 108137050 A | 6/2018 |
| JP | 2020-032894 A | 3/2020 |

(Continued)

*Primary Examiner* — Mohamad O El Sayah
(74) *Attorney, Agent, or Firm* — Oliff PLC

(57) ABSTRACT

A motion manager includes one or more processors. The one or more processors are configured to receive each piece of information indicating kinematic plans from a plurality of systems. The systems include a first system and a second system. The one or more processors are configured to receive, from the first system, request information requesting to select a first kinematic plan by prioritizing the first kinematic plan set in the first system over a second kinematic plan set in the second system The one or more processors are configured to arbitrate the kinematic plans. The one or more processors are configured to distribute a motion request to the vehicle to at least one of actuators. The motion request is set based on arbitration results.

20 Claims, 6 Drawing Sheets

(56) References Cited

U.S. PATENT DOCUMENTS

| | | | |
|---|---|---|---|
| 2019/0092320 A1* | 3/2019 | Nagata | B60W 30/09 |
| 2019/0256064 A1* | 8/2019 | Hecker | B60W 50/0205 |
| 2020/0070849 A1 | 3/2020 | Suzuki et al. | |
| 2020/0070873 A1* | 3/2020 | Itabashi | B60R 16/0231 |
| 2020/0128082 A1* | 4/2020 | Azuma | H04L 67/61 |
| 2020/0257282 A1* | 8/2020 | Lavoie | G05D 1/00 |
| 2020/0379462 A1 | 12/2020 | Kawamoto | |
| 2021/0001849 A1* | 1/2021 | Miura | B60W 10/08 |
| 2021/0171076 A1* | 6/2021 | Arimoto | B60L 15/42 |
| 2021/0402981 A1* | 12/2021 | Bielby | B60W 10/18 |
| 2022/0219711 A1 | 7/2022 | Ohashi et al. | |
| 2022/0315018 A1 | 10/2022 | Miyake et al. | |
| 2023/0132512 A1* | 5/2023 | Clawson | B60W 30/095 701/26 |

FOREIGN PATENT DOCUMENTS

| | | |
|---|---|---|
| JP | 2022-109054 A | 7/2022 |
| JP | 2022-160174 A | 10/2022 |

\* cited by examiner

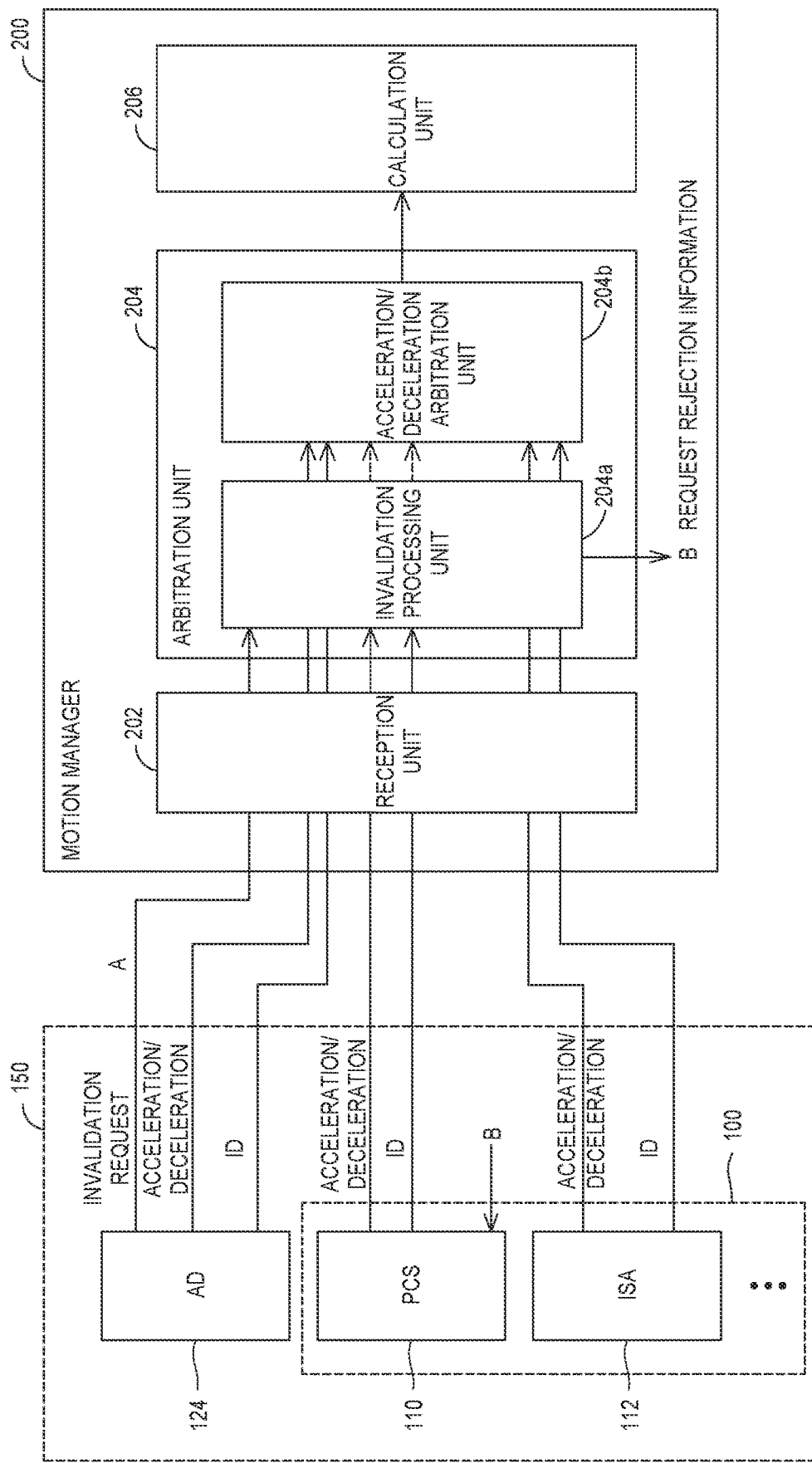

MOTION MANAGER, AUTONOMOUS DRIVING APPARATUS, AND CONTROL SYSTEM

CROSS-REFERENCE TO RELATED APPLICATION

This application claims priority to Japanese Patent Application No. 2021-194275 filed on Nov. 30, 2021, incorporated herein by reference in its entirety.

BACKGROUND

1. Technical Field

The present disclosure relates to a motion manager, an autonomous driving apparatus, and a control system.

2. Description of Related Art

A vehicle is well-known which is composed of a plurality of applications that set and request kinematic plans on driver assistance of the vehicle, a motion manager that unifies a plurality of kinematic plans from the plurality of applications and sets motion requests based on the unified kinematic plan, and an actuator system that realizes the set motion requests. In this vehicle, for example, when unifying the kinematic plans requested from each of the applications to the motion manager, a request value that satisfies a predetermined condition may be selected from among a plurality of request values.

For example, Japanese Unexamined Patent Application Publication No. 2020-032894 discloses a technique for selecting the minimum value from among a plurality of accelerations requested from applications on autonomous driving or on various kinds of driver assistance.

SUMMARY

In the above-described vehicle, in a case where there is a plurality of applications that set kinematic plans, when, for example, one application sets a kinematic plan for executing a series of operations of a vehicle, such as autonomous driving, and the other system sporadically sets kinematic plans, the execution of the kinematic plan for executing the series of operations may be hindered by the sporadically set kinematic plans. For this reason, the one application may not be capable of realizing the series of intended operations of the vehicle.

The present disclosure provides a motion manager, an autonomous driving apparatus, a control system, a vehicle, a control method of the vehicle, and a non-transitory storage medium that appropriately set a kinematic plan on driver assistance of the vehicle.

A motion manager according to a first aspect of the present disclosure is configured to request motion of a vehicle according to a plurality of kinematic plans, set in each of a plurality of systems, on driver assistance of the vehicle to at least one of a plurality of actuators provided in the vehicle. The motion manager includes one or more processors configured to receive each piece of information indicating the kinematic plans from the plurality of systems including a first system and a second system, receive, from the first system, request information requesting to select a first kinematic plan by prioritizing the first kinematic plan set in the first system over a second kinematic plan set in the second system, arbitrate the kinematic plans and distribute a motion request to the vehicle to at least one of the actuators. The motion request is set based on arbitration results.

In such a manner, it is possible to restrict the execution of the first kinematic plan from being hindered by the second kinematic plan. For this reason, it is possible to control the vehicle based on the kinematic plan set in the first system while restricting interference of functions between the first system and the second system.

In the first aspect, the request information may include information requesting invalidation of the second kinematic plan set in the second system.

In such a manner, in a case where the request information is received from the first system, when the second kinematic plan is invalidated, it is possible to restrict the execution of the first kinematic plan from being hindered by the second kinematic plan.

In the first aspect, the request information may include information requesting to give the first kinematic plan set in the first system a higher priority than the second kinematic plan set in the second system.

In such a manner, when the request information is received from the first system, the first kinematic plan has the higher priority than the second kinematic plan, and thus it is possible to restrict the execution of the first kinematic plan from being hindered by the second kinematic plan.

In the first aspect, the one or more processors may be configured to arbitrate the kinematic plans according to the received request information.

In such a manner, when the request information is received, the one or more processors arbitrate the kinematic plans according to the request information, and thus it is possible to restrict the execution of the first kinematic plan from being hindered by the second kinematic plan.

In the first aspect, the one or more processors may be configured to output information on the request information to the second system.

In such a manner, the information on the request information is output to the second system, and thus it is possible to prevent the second system from being determined to be in an abnormal state due to, for example, the second kinematic plan being unselected by the one or more processors.

In the first aspect, the plurality of systems may further include a third system that is different from the first system and the second system, and is configured to set a kinematic plan over which the first kinematic plan is not prioritized.

In such a manner, the first kinematic plan is not prioritized over the kinematic plan set in the third system, and thus it is possible to restrict the execution of a kinematic plan of which invalidation is not requested from being hindered.

In the first aspect, the motion manager may further include a storage configured to store information on at least one of the second system and the third system.

In such a manner, it is possible to store the information on at least one of the second system and the third system.

In the first aspect, the first system may include an autonomous driving system. Each of the second system and the third system may include a system mounted on the vehicle.

In such a manner, it is possible to restrict the execution of the first kinematic plan set by the autonomous driving system from being hindered by the second kinematic plan set by the system mounted on the vehicle.

In the first aspect, the first system may include an autonomous driving system. Each of the second system and the third system may include at least one of a plurality of driver assistance systems.

In such a manner, it is possible to restrict the execution of the first kinematic plan set by the autonomous driving system from being hindered by the second kinematic plan set by the second system which is the driver assistance system.

In the first aspect, the third system may include a system set to comply with a law.

In such a manner, it is possible to restrict the first kinematic plan from being prioritized over the kinematic plan set in the third system.

In the first aspect, the second system may include a system configured to assist driving of a driver of the vehicle.

In such a manner, it is possible to restrict the execution of the first kinematic plan set by the first system from being hindered by the second kinematic plan set by the system configured to assist an operation of the driver of the vehicle.

In the first aspect, the one or more processors may be configured to receive the request information from the first system during autonomous driving of the vehicle, and to not receive the request information from the first system during manual driving of the vehicle.

In such a manner, it is possible to restrict behavior of the vehicle that is not intended by the driver from occurring during the manual driving of the vehicle.

An autonomous driving apparatus according to a second aspect of the present disclosure is configured to transmit a first kinematic plan on autonomous driving to a motion manager configured to control behavior of a vehicle. The motion manager is configured to request motion of the vehicle according to a plurality of kinematic plans, set in each of a plurality of systems, on driver assistance of the vehicle to at least one of a plurality of actuators provided in the vehicle. The autonomous driving apparatus includes a first system configured to set the first kinematic plan, and transmit, to the motion manager, the first kinematic plan set in the autonomous driving apparatus and request information. The request information is information requesting to select the first kinematic plan by prioritizing the first kinematic plan over a second kinematic plan. The plurality of systems include the first system, and a second system mounted on the vehicle and configured to set the second kinematic plan.

A control system according to a third aspect of the present disclosure includes a motion manager and an autonomous driving system. The motion manager is configured to request motion of a vehicle according to a plurality of kinematic plans, set in each of a plurality of systems including the autonomous driving system, on driver assistance of the vehicle to at least one of a plurality of actuators provided in the vehicle. The autonomous driving system is configured to set a first kinematic plan from among the kinematic plans and transmit, to the motion manager, request information requesting to select the first kinematic plan by prioritizing the first kinematic plan over a second kinematic plan. The plurality of systems include the autonomous driving system, and a system mounted on the vehicle and configured to set the second kinematic plan.

A vehicle according to a fourth aspect of the present disclosure includes a motion manager and an autonomous driving system. The motion manager is configured to request motion of the vehicle according to a plurality of kinematic plans, set in each of a plurality of systems including the autonomous driving system, on driver assistance of the vehicle to at least one of a plurality of actuators provided in the vehicle. The autonomous driving system is configured to set a first kinematic plan from among the kinematic plans, and transmit, to the motion manager, request information requesting to select the first kinematic plan by prioritizing the first kinematic plan over a second kinematic plan. The plurality of systems include the autonomous driving system and a system mounted on the vehicle and configured to set the second kinematic plan.

A control method of a vehicle according to a fifth aspect of the present disclosure is executed by a computer. The control method includes receiving each piece of information indicating a plurality of kinematic plans, set in each of a plurality of systems including a first system and a second system, on driver assistance of the vehicle, arbitrating the kinematic plans, distributing a motion request to the vehicle, to at least one of a plurality of actuators provided in the vehicle, and receiving, from the first system, request information requesting to select a first kinematic plan by prioritizing the first kinematic plan set in the first system over a second kinematic plan set in the second system. The motion request is set based on arbitration results.

A non-transitory storage medium according to a sixth aspect of the present disclosure stores instructions that are executable by a computer and that cause the computer to execute functions. The functions include receiving each piece of information indicating a plurality of kinematic plans, set in each of a plurality of systems including a first system and a second system, on driver assistance of a vehicle, arbitrating the kinematic plans, distributing a motion request to the vehicle, to at least one of a plurality of actuators provided in the vehicle, and receiving, from the first system, request information requesting to select a first kinematic plan by prioritizing the first kinematic plan set in the first system over a second kinematic plan set in the second system. The motion request is set based on arbitration results.

With each aspect of the present disclosure, it is possible to provide a motion manager, an autonomous driving apparatus, a control system, a vehicle, a control method of the vehicle, and a non-transitory storage medium that appropriately set a kinematic plan on driver assistance of the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 6 is a diagram for describing an example of an operation of the vehicle.

DETAILED DESCRIPTION OF EMBODIMENTS

Figure 1:
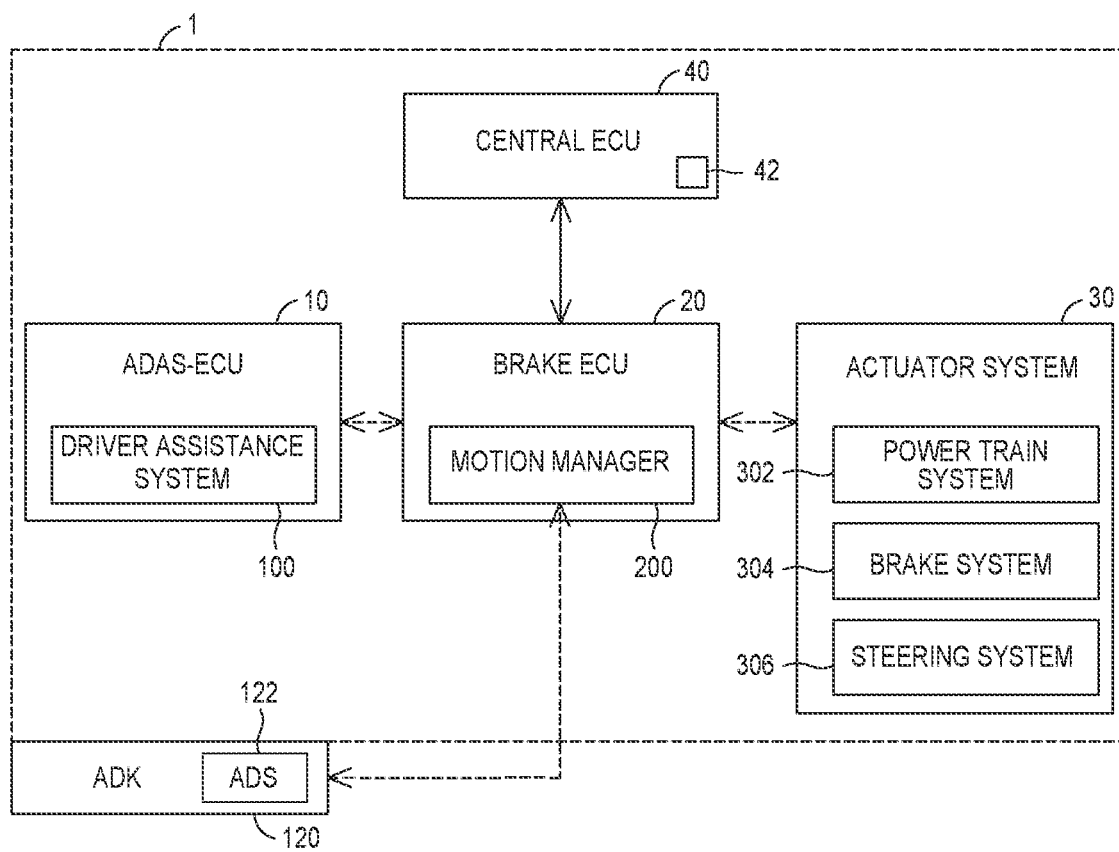
FIG. 1 is a diagram illustrating an example of a configuration of a vehicle.

Hereinafter, embodiments of the present disclosure will be described in detail with reference to the drawings. The same or corresponding parts in the drawings are denoted by the same reference signs and the description thereof will not be repeated.

FIG. 1 is a diagram illustrating an example of a configuration of a vehicle 1. As illustrated in FIG. 1, the vehicle 1 includes an ADAS-electronic control unit (ECU) 10, a brake ECU 20, an actuator system 30, a central ECU 40, and an autonomous driving kit (ADK) 120, which is an autonomous driving device.

The vehicle 1 may be a vehicle having a configuration capable of realizing a function of a driver assistance system described below, and may be, for example, a vehicle having an engine as a driving source, a battery electric vehicle having an electric motor as a driving source, or a hybrid electric vehicle having an engine and an electric motor mounted thereon and using at least one of them as a driving source.

The ADAS-ECU 10, the brake ECU 20, the central ECU 40, and the ADK 120 all include computers each of which has a processor that executes a program, such as a central processing unit (CPU), a memory, and an input/output interface.

The ADAS-ECU 10 includes a driver assistance system 100 having a function of driver assistance of the vehicle 1. The driver assistance system 100 is configured to realize various functions for assisting driving of the vehicle 1 including at least one of a steering control, a driving control, and a braking control of the vehicle 1 by executing applications mounted on the driver assistance system 100. Examples of the applications mounted on the driver assistance system 100 include an application that realizes a function of an autonomous parking system, and an application (hereinafter, referred to as an ADAS application) that realizes a function of an advanced driver assistance system (ADAS), and the like.

Examples of the ADAS application include at least one of an application that realizes a function of follow-up traveling (an adaptive cruise control (ACC), or the like) that travels while constantly keeping a distance with a preceding vehicle, an application that realizes a function of an auto speed limiter (ASL) that recognizes a vehicle velocity limit and maintains an upper limit of velocity of a subject vehicle, an application that realizes a function of a lane maintenance assistance (a lane keeping assist (LKA), a lane tracing assist (ASL), or the like) that executes maintenance of a lane in which a vehicle travels, an application that realizes a function of a collision damage mitigation braking (an autonomous emergency braking (AEB), a pre-crash safety (PCS), or the like) that executes autonomous braking to mitigate damage caused by collision, an application that realizes a function of a lane departing warning (a lane departure warning (LDW), a lane departure alert (LDA), or the like) that warns the vehicle 1 of departure from a lane in which it travels, and an application that realizes a function of an intelligent speed assistance (ISA) that controls a vehicle such that the speed of the vehicle does not exceed an upper limit speed.

Each application of the driver assistance system 100 outputs, to the brake ECU 20 (more specifically, the motion manager 200), a request for a kinematic plan that guarantees a commercial value (a function) of each application based on information of a vehicle surroundings situation acquired (input) from a plurality of sensors (not shown), an assistance request of a driver, or the like. Examples of the plurality of sensors include a vision sensor, such as a forward-looking camera, a radar, light detection and ranging (LiDAR), a position detection device, or the like.

The forward-looking camera is arranged, for example, on the backside of a rear-view mirror in a vehicle cabin and is used for capturing an image of the front of the vehicle. The radar is a distance measuring device that beams radio waves having a short wavelength on an object, detects the radio waves returning from the object, and measures a distance or a direction to the object. The LiDAR is a distance measuring device that beams a laser beam (light, such as infrared rays) in a pulse shape on an object and measures a distance by the time until it is reflected by the object and returns. The position detection device is composed of, for example, the Global Positioning System (GPS) that detects a position of the vehicle 1 using information received from a plurality of satellites orbiting the earth.

Each application acquires information of the vehicle surroundings situation that integrates detection results of one or more sensors as recognition sensor information, and acquires an assistance request of the driver by way of a user interface (not shown), such as a switch. For example, each application can recognize other vehicles, obstacles, or people on the surroundings of the vehicle by image processing on an image or video on the surroundings of the vehicle acquired by the plurality of sensors, using artificial intelligence (AI) or image processing processor.

Further, the kinematic plan includes, for example, a request for longitudinal acceleration/deceleration generated in the vehicle 1, a request for a steering angle of the vehicle 1, a request for holding stopping of the vehicle 1, or the like.

Examples of the request for the longitudinal acceleration/deceleration generated in the vehicle 1 include an operation request to a power train system 302 or an operation request to a brake system 304.

Examples of the request for holding the stopping of the vehicle 1 include requests for permitting and prohibiting an operation of at least one of an electric parking brake and a parking lock mechanism (neither shown).

The electric parking brake limits rotation of wheels of the vehicle 1 by, for example, operating an actuator. The electric parking brake may be configured to limit the rotation of the wheels by, for example, operating a brake for a parking brake provided on a part of a plurality of wheels provided on the vehicle 1 using an actuator. Alternatively, the electric parking brake may limit the rotation of the wheels by operating an actuator for the parking brake, arbitrating hydraulic pressure supplied to the brake device of the brake system 304, and operating the brake device.

The parking lock mechanism limits rotation of an output shaft of a transmission by operating an actuator. The parking lock mechanism fits, for example, a protrusion unit provided at a tip of a parking lock pole, a position of which is arbitrated by an actuator into a tooth portion of a gear (a lock gear) provided connected to a rotating element in the transmission of the vehicle 1. In this manner, the rotation of the output shaft of the transmission is limited and the rotation of driving wheels is limited.

The application mounted on the driver assistance system 100 is not particularly limited to the above-described applications. An application that realizes other functions may be added or an existing application may be omitted, and, in particular, the number of the mounted applications is not limited.

Further, in the present embodiment, a case where the ADAS-ECU 10 includes the driver assistance system 100 composed of a plurality of applications is described, but for example, an ECU may be provided for each application. For example, the driver assistance system 100 may be composed of an ECU having an application that realizes a function of an autonomous parking system mounted thereon, and an ECU having an ADAS application mounted thereon.

The ADK 120 includes an autonomous driving system (ADS) 122. The ADK 120 is configured to be removable from the vehicle 1 and replaceable with another ADK. The ADS 122 has an application that realizes a function of autonomous driving. The ADS 122 outputs, to the brake ECU 20, a request for a kinematic plan (that is, a kinematic plan for executing the autonomous driving) that guarantees a commercial value (a function) of each application based on the information on the situation around the vehicle or the like, acquired from a plurality of sensors mounted on the ADK 120 or the vehicle 1. An example of the sensors mounted on the ADK 120 includes a vision sensor, such as a forward-looking camera, a radar, a light detection and ranging (LiDAR), or a position detection device. Since these sensors are described above, detailed description thereof will not be repeated. For example, in a section from a current location to a destination set in advance, or a part of the section, the autonomous driving is executed by executing at least one operation of acceleration/deceleration, steering, and stopping of the vehicle 1 according to the situation around the vehicle 1 without an operation of the driver. In the present embodiment, the ADS 122 is configured to be capable of acquiring information on the situation around the vehicle 1 by a sensor or an image processing device of a system separate from the driver assistance system 100.

The application that realizes the function of the autonomous driving may be included in, for example, the driver assistance system 100, or may be mounted on an ECU different from the ADAS-ECU 10.

The brake ECU 20 includes a motion manager 200. In the present embodiment, the case where the brake ECU 20 has a hardware configuration including the motion manager 200 is described as an example, but the motion manager 200 may be provided as a single ECU separate from the brake ECU 20 or may be included in another ECU different from the brake ECU 20. The brake ECU 20 is configured to be able to communicate with each of the ADAS-ECU 10, various ECUs included in the actuator system 30, the central ECU 40, and the ADK 120.

The motion manager 200 requests, to the actuator system 30, the motion of the vehicle 1 according to the kinematic plan set in at least one of the applications of the driver assistance system 100 and the application that realizes the function of the autonomous driving of the ADS 122. Detailed configuration of the motion manager 200 will be described below.

The actuator system 30 is configured to realize the request for the motion of the vehicle 1 output from the motion manager 200. The actuator system 30 includes a plurality of actuators. FIG. 1 illustrates an example where the actuator system 30 includes, for example, a power train system 302, a brake system 304, and a steering system 306 as actuators. The number of actuators that are requesting destinations of the motion manager 200 is not limited to three as described above, but may be four or more, or may be two or less.

The power train system 302 includes a power train capable of generating a driving force on the drive wheels of the vehicle 1 and an ECU (neither shown) that controls the operation of the power train. The power train includes, for example, at least one of an internal combustion engine, such as a gasoline engine or a diesel engine, a transmission including a gearbox, a differential device, or the like, a motor generator as a driving source, a power accumulation device that accumulates power supplied to the motor generator, a power conversion device that mutually converts power between the motor generator and the power accumulation device, and a power generating source, such as a fuel cell. The ECU that controls the operation of the power train executes a control of a corresponding device so as to realize the request for the motion from the motion manager 200 to the corresponding device in the power train system 302.

The brake system 304 includes, for example, a plurality of brake devices provided on respective wheels of the vehicle 1. The brake devices include, for example, a hydraulic brake, such as a disc brake that generates a braking force using hydraulic pressure. As the brake device, for example, a motor generator that is connected to a wheel and that generates regenerative torque, may be further included. A braking operation of the vehicle 1 using the plurality of brake devices is controlled by the brake ECU 20. Separately from the motion manager 200, for example, a control unit (not shown) used for controlling the brake system 304 is provided in the brake ECU 20.

The steering system 306 includes, for example, a steering device capable of changing a steering angle of a steering wheel (for example, a front wheel) of the vehicle 1 and an ECU (neither shown) that controls an operation of the steering device. The steering device includes, for example, the steering wheel that changes the steering angle according to an operation amount, and an electric power steering (EPS) in which the steering angle can be arbitrated by an actuator, separately from the operation of the steering wheel. The ECU that controls the operation of the steering device controls an operation of an actuator of the EPS.

The central ECU 40 includes a memory 42 capable of updating stored contents. The central ECU 40 is configured to be communicable with, for example, the brake ECU 20, and configured to be communicable with a device (not shown, for example, a server) outside the vehicle 1 by way of a communication module (not shown). When update information is received from a server outside the vehicle 1, the central ECU 40 updates information stored in the memory 42 using the received update information. Predetermined information is stored in the memory 42. The predetermined information includes, for example, information read from various ECUs when the system of the vehicle 1 is started.

In the present embodiment, it is described that the central ECU 40 reads predetermined information from various ECUs when the system of the vehicle 1 is started, but may have a function, such as relaying communication between various ECUs (a gateway function).

Figure 2:
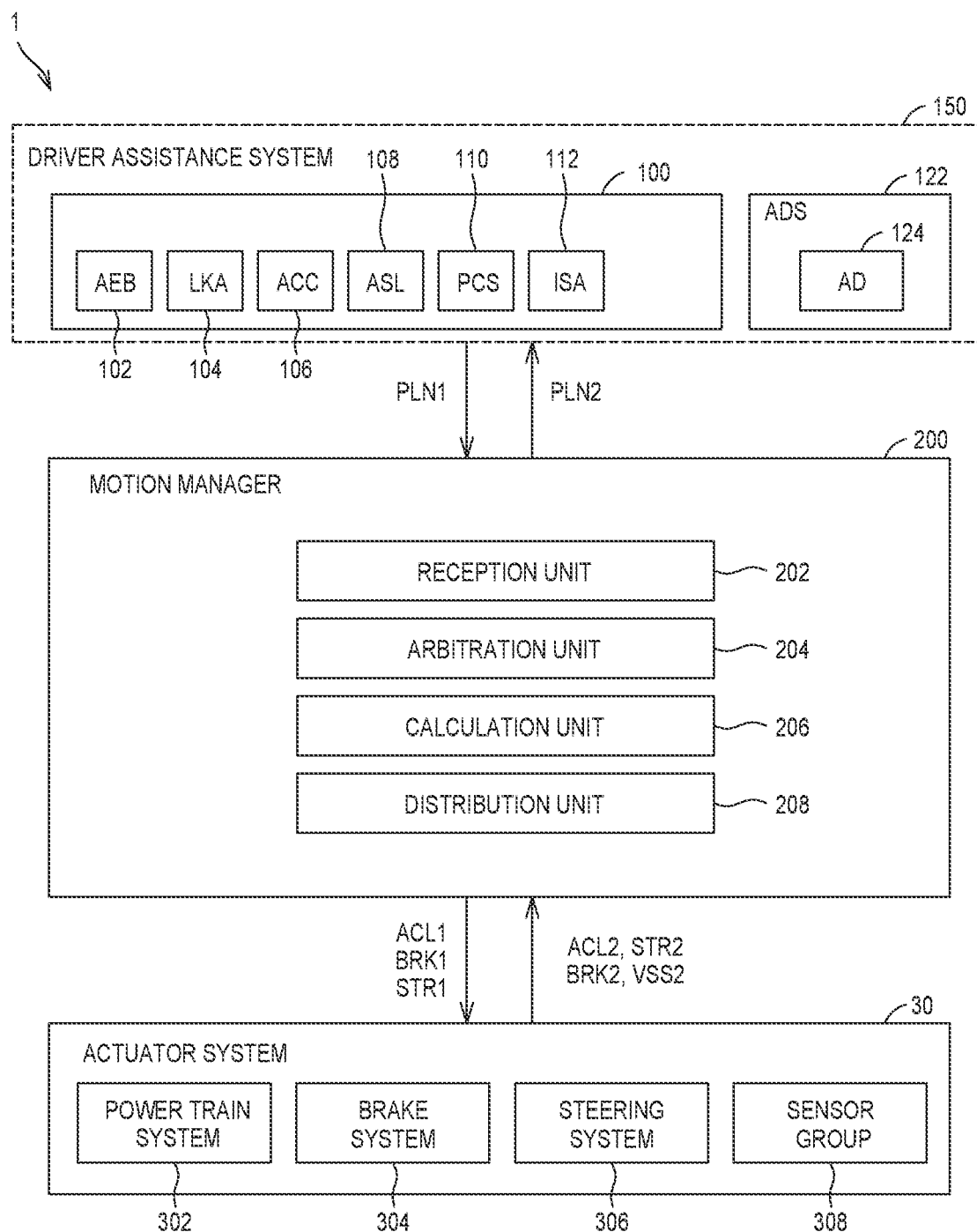
FIG. 2 is a diagram for describing an example of an operation of a motion manager.

Hereinafter, an example of an operation of the motion manager 200 will be described in detail with reference to FIG. 2. FIG. 2 is a diagram used for describing an example of the operation of the motion manager 200.

FIG. 2 illustrates a system group 150 including the driver assistance system 100 and the ADS 122. Further, FIG. 2 illustrates an example where the driver assistance system 100 includes, for example, an AEB 102, an LKA 104, an ACC 106, an ASL 108, a PCS 110, and an ISA 112 as applications. Further, FIG. 2 illustrates a case where the ADS 122 includes, for example, the AD 124, which is an application that realizes the function of the autonomous driving (AD). A request for a kinematic plan set in at least one of a plurality of applications is transmitted from the system group 150 including the driver assistance system 100 and the ADS 122 to the motion manager 200 as a request signal PLN1.

The request signal PLN1 includes, for example, information on a target acceleration set in the ACC, the AEB, the ASL, the PCS, the ISA, or the AD as one of the kinematic plans, information on a target curvature set in the LKA or the AD as one of the kinematic plans, or the like.

The motion manager 200 sets the motion requested to the vehicle 1 based on the request for the kinematic plans included in the received request signal PLN1, and requests the actuator system 30 to realize the set motion. In other words, the motion manager 200 transmits, to the actuator system 30, an operation request to the power train system 302 as a request signal ACL1. The motion manager 200 transmits, to the actuator system 30, an operation request to the brake system 304 as a request signal BRK1. Further, the motion manager 200 transmits, to the actuator system 30, an operation request to the steering system 306 as a request signal STR1.

The request signal ACL1 includes, for example, information on a request value of driving torque or a driving force or information on a method of arbitration (for example, which to select between a maximum value or a minimum value or whether to change a value stepwise or gradually).

The request signal BRK1 includes, for example, information on a request value of braking torque, information on a method of arbitration (for example, whether to change a value stepwise, gradually, or the like), or information on execution timing of braking (whether to immediately execute, or the like).

The request signal STR1 includes, for example, information on a target steering angle, information on whether the target steering angle is effective, or information on upper and lower limit torques of an assistance torque of an operation of the steering wheel.

The actuator that has received a corresponding request signal from among the plurality of actuators composing the actuator system 30 is controlled such that an operation request included in the request signal is realized.

Hereinafter, an example of a configuration of the motion manager 200 will be described. As illustrated in FIG. 2, the motion manager 200 includes a reception unit 202, an arbitration unit 204, a calculation unit 206, and a distribution unit 208.

The reception unit 202 receives a request for the kinematic plans output by one or more applications of the system group 150. Details of the kinematic plan in the present embodiment will be described below.

The arbitration unit 204 arbitrates the request for the kinematic plans received from the respective applications via the reception unit 202. An example of this arbitration processing can be selecting one kinematic plan from among the kinematic plans based on a predetermined selection criterion. Alternatively, another example of the arbitration processing can be setting a new kinematic plan based on the kinematic plans. The arbitration unit 204 may further add predetermined information received from the actuator system 30 and arbitrate the request for the kinematic plans. Further, the arbitration unit 204 may determine whether to temporarily prioritize the motion of the vehicle 1 that is required according to a driver state and a vehicle state over the motion of the vehicle 1 that corresponds to the kinematic plan determined based on an arbitration result.

The calculation unit 206 calculates motion requests based on the arbitration result of the request for the kinematic plans in the arbitration unit 204 and the motion of the vehicle 1 that is determined based on the arbitration result. The motion request is a physical amount used for controlling at least one actuator of the actuator system 30, and includes a physical amount different from a physical amount of the request for the kinematic plans. For example, when the request for the kinematic plans (a first request) is a longitudinal acceleration, the calculation unit 206 calculates a value obtained by converting the acceleration into the driving force or the driving torque to be the motion request (a second request).

The distribution unit 208 distributes the motion requests calculated by the calculation unit 206 to at least one actuator of the actuator system 30. When, for example, the acceleration of vehicle 1 is requested, the distribution unit 208 distributes the motion requests only to the power train system 302. Alternatively, when deceleration of the vehicle 1 is requested, the distribution unit 208 appropriately distributes the motion requests to the power train system 302 and the brake system 304 in order to realize a target deceleration.

Information on a state of the power train system 302 is transmitted from the power train system 302 of the actuator system 30 to the motion manager 200 as a signal ACL2. Examples of the information on the state of the power train system 302 include information on an operation of an accelerator pedal, information on an actual driving torque or an actual driving force of the power train system 302, actual shift range information, information on upper and lower limits of the driving torque, information on upper and lower limits of the driving force, or information on reliability of the power train system 302.

Information on a state of the brake system 304 is transmitted from the brake system 304 of the actuator system 30 to the motion manager 200 as a signal BRK2. Examples of the information on the state of the brake system 304 include information on an operation of the brake pedal, information on a braking torque requested by the driver, information on a request value of the braking torque after arbitration, information on the actual braking torque after arbitration, or information on reliability of the brake system 304.

Information on a state of the steering system 306 is transmitted from the steering system 306 of the actuator system 30 to the motion manager 200 as a signal STR2. Examples of the information on the state of the steering system 306 include information on reliability of the steering system 306, information on whether the driver grips the steering wheel, information on torque for operating the steering wheel, or information on a rotation angle of the steering wheel.

Further, the actuator system 30 includes a sensor group 308, in addition to the power train system 302, the brake system 304, and the steering system 306 that are described above.

The sensor group 308 includes a plurality of sensors that detect behavior of the vehicle 1. The sensor group 308 includes, for example, a longitudinal G sensor that detects a vehicle body acceleration in the longitudinal direction of the vehicle 1, a lateral G sensor that detects the vehicle body acceleration in the lateral direction of the vehicle 1, a wheel velocity sensor that is provided on each wheel and that detects a wheel velocity, and a yaw rate sensor that detects an angular velocity of the rotation angle (a yaw angle) in the yaw direction. The sensor group 308 transmits information including detection results of the plurality of sensors to the motion manager 200 as a signal VSS2. In other words, the signal VSS2 includes, for example, a detection value of the longitudinal G sensor, a detection value of the lateral G sensor, a detection value of the wheel velocity sensor of each wheel, a detection value of the yaw rate sensor, and information on reliability of each sensor.

Upon receiving various signals from the actuator system 30, the motion manager 200 transmits predetermined information as a signal PLN2 to the driver assistance system 100.

The configuration of the device mounted on the vehicle 1 and the configuration of the motion manager 200 that are described above are examples, and can be added, replaced, changed, omitted, or the like as appropriate. Further, a function of each device can be appropriately integrated into one device or distributed to a plurality of devices, and executed.

In the vehicle 1 having the configuration as above, as described above, the motion manager 200 arbitrates and unifies the kinematic plans received from each application of the driver assistance system 100. In other words, the motion manager 200 selects one kinematic plan from among the kinematic plans based on a predetermined selection criterion. The motion manager 200 requests the actuator system 30 for motion of the vehicle 1 according to the selected kinematic plan.

In the above-described vehicle 1, when there are applications that set kinematic plans and, for example, the first kinematic plan for executing a series of operations, such as the autonomous driving, is set in the ADS 122 and a second kinematic plan is sporadically set in the other system, the execution of the first kinematic plan may be hindered by the second kinematic plan. For this reason, there is a case where the series of operations of the vehicle 1 intended in the ADS 122 cannot be realized. In particular, the ADS 122 is provided separately from the driver assistance system 100 mounted on the vehicle 1, and information on the situation around the vehicle 1 is acquired by a sensor of a system separate from the various sensors mounted on the vehicle 1. Thus, the execution of the first kinematic plan may be hindered by the second kinematic plan due to a difference in accuracy of detection, a difference in accuracy of image analysis, or the like.

Therefore, in the present embodiment, the reception unit 202 of the motion manager 200 receives, from the ADS 122, request information requesting to select the first kinematic plan by prioritizing the first kinematic plan set in the ADS 122 over the second kinematic plan set in a predetermined application of the driver assistance system 100. The arbitration unit 204 arbitrates the kinematic plans according to the received request information. In the present embodiment, the request information includes a request to invalidate the second kinematic plan set in the predetermined application of the driver assistance system 100.

In such a manner, it is possible to restrict the execution of the first kinematic plan set in the ADS 122 from being hindered by the second kinematic plan set in the other application of the driver assistance system 100. For this reason, it is possible to control the vehicle 1 based on the kinematic plan set in the ADS 122 while restricting the interference of functions between the ADS 122 and the driver assistance system 100.

Figure 3:
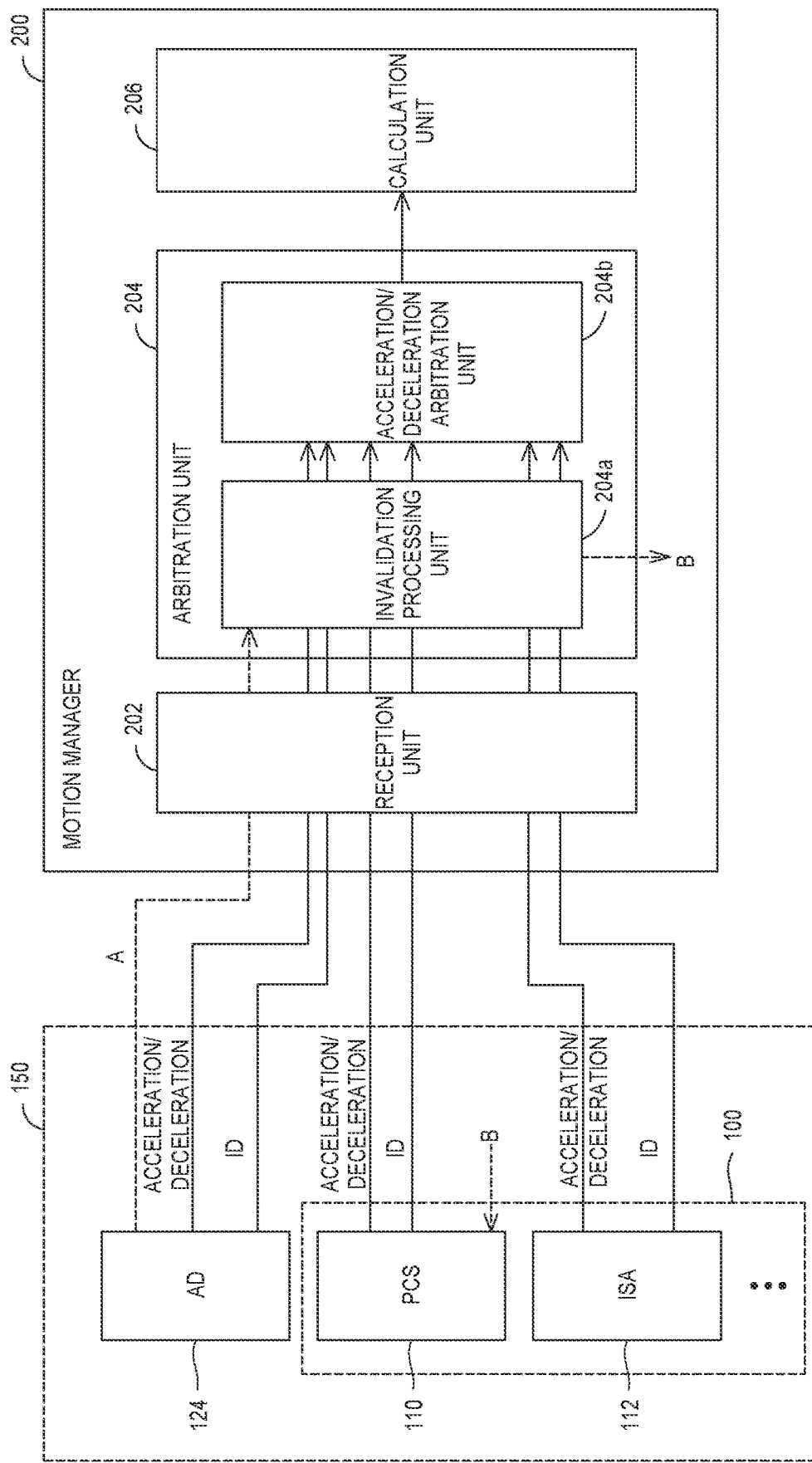
FIG. 3 is a diagram illustrating an example of configurations of a system group and the motion manager.

Hereinafter, an example of functions of the reception unit 202 and the arbitration unit 204 of the motion manager 200 in the present embodiment will be described with reference to FIG. 3. FIG. 3 is a diagram illustrating an example of configurations of the system group 150 and the motion manager 200.

As illustrated in FIG. 3, the system group 150 includes the AD 124 and the driver assistance system 100. FIG. 3 illustrates an example where the driver assistance system 100 includes the PCS 110 and the ISA 112. Further, FIG. 3 illustrates an example where, as a kinematic plan, a request value for acceleration/deceleration is input from the system group 150 to the motion manager 200.

In the present embodiment, the PCS 110 is configured to, for example, be capable of outputting, to the motion manager 200, a kinematic plan including the request value for acceleration/deceleration, and identification information (hereinafter, referred to as an ID) used for identifying that an application from which the kinematic plan is output is the PCS 110.

Further, in the same manner, the ISA 112 is also configured to, for example, be capable of outputting, to the motion manager 200, a kinematic plan including the request value for acceleration/deceleration, and an ID used for identifying that an application from which the kinematic plan is output is the ISA 112.

Further, as represented by a dashed arrow A of FIG. 3, the AD 124 is configured to, for example, be capable of outputting, to the motion manager 200, any of request information (hereinafter, sometimes referred to as an invalidation request) requesting the invalidation of the kinematic plan from the predetermined application and request information (hereinafter, sometimes referred to as an invalidation cancellation request) requesting cancellation of the invalidation, in addition to a kinematic plan including a request value for acceleration/deceleration or the like and an ID used for identifying that an application from which the kinematic plan is output is the AD 124. In the present embodiment, an example of the predetermined application includes the application of the PCS 110.

The reception unit 202 of the motion manager 200 receives kinematic plans including various request values and IDs from respective applications of the driver assistance system 100, and receives an invalidation request in addition to the kinematic plan including the request value and the ID from the AD 124. Various pieces of information received in the reception unit 202 may be stored in, for example, a storage device, such as a memory.

Upon receiving the invalidation request from the AD 124, the motion manager 200 unifies the kinematic plans by invalidating the kinematic plan including the request value from the PCS 110 and arbitrating other kinematic plans.

In the present embodiment, upon receiving the invalidation request, the arbitration unit 204 executes processing for invalidating the kinematic plan from the PCS 110.

More specifically, the arbitration unit 204 includes an invalidation processing unit 204a and an acceleration/deceleration arbitration unit 204b. When the invalidation processing unit 204a does not receive the invalidation request, as illustrated in FIG. 3, it outputs the kinematic plans to the acceleration/deceleration arbitration unit 204b without invalidating the kinematic plan (for example, the request value for acceleration/deceleration) input from the PCS 110 via the reception unit 202. In other words, the invalidation processing unit 204a outputs the kinematic plan from the AD 124, the kinematic plan from the PCS 110, and the kinematic plan from the ISA 112 to the acceleration/deceleration arbitration unit 204b.

On the other hand, when the invalidation processing unit 204a receives the invalidation request, it invalidates the kinematic plan input from the PCS 110 via the reception unit 202 and does not output the kinematic plan to the acceleration/deceleration arbitration unit 204b. In other words, the invalidation processing unit 204a outputs the kinematic plan from the AD 124 and the kinematic plan from the ISA 112 to the acceleration/deceleration arbitration unit 204b.

Further, upon receiving the invalidation request and invalidating the kinematic plan from the PCS 110 (that is, does not output the kinematic plan to the acceleration/deceleration arbitration unit 204b), as represented by a dashed arrow B of FIG. 3, the invalidation processing unit 204a is configured to be capable of outputting, to the PCS 110, information (hereinafter, referred to as request rejection information) indicating that the kinematic plan from the PCS 110 is invalidated.

The dashed arrow A and the dashed arrow B of FIG. 3 represent, as an example, a state where the invalidation request is not received and the request rejection information is not output to the PCS 110.

When, for example, the request rejection information is input from the invalidation processing unit 204a, the PCS 110 restricts making a determination that an abnormality has occurred because the kinematic plan set in the PCS 110 is not selected.

The acceleration/deceleration arbitration unit 204b arbitrates (determines) a final request value using the kinematic plan including the request value input from the invalidation processing unit 204a and the ID. Specifically, the acceleration/deceleration arbitration unit 204b determines, as the final acceleration/deceleration request value, for example, the minimum value from among the request values for acceleration/deceleration that are input from the invalidation processing unit 204a. The acceleration/deceleration arbitration unit 204b outputs an arbitration result (the final request value for acceleration/deceleration) to the calculation unit 206.

When the same values are input as the minimum value from among a plurality of request values at different timings, the acceleration/deceleration arbitration unit 204b determines, for example, a request value input the earliest as the final request value for acceleration/deceleration. Further, when the same values are input as the minimum value from among a plurality of request values at the same time, the acceleration/deceleration arbitration unit 204b determines, for example, a request value of an ID having a higher priority as the final request value for acceleration/deceleration. The method of arbitrating the request value is not limited to the method of selecting the minimum value as described above. For example, a request value corresponding to an ID having a higher priority may be determined as the final request value.

Figure 4:
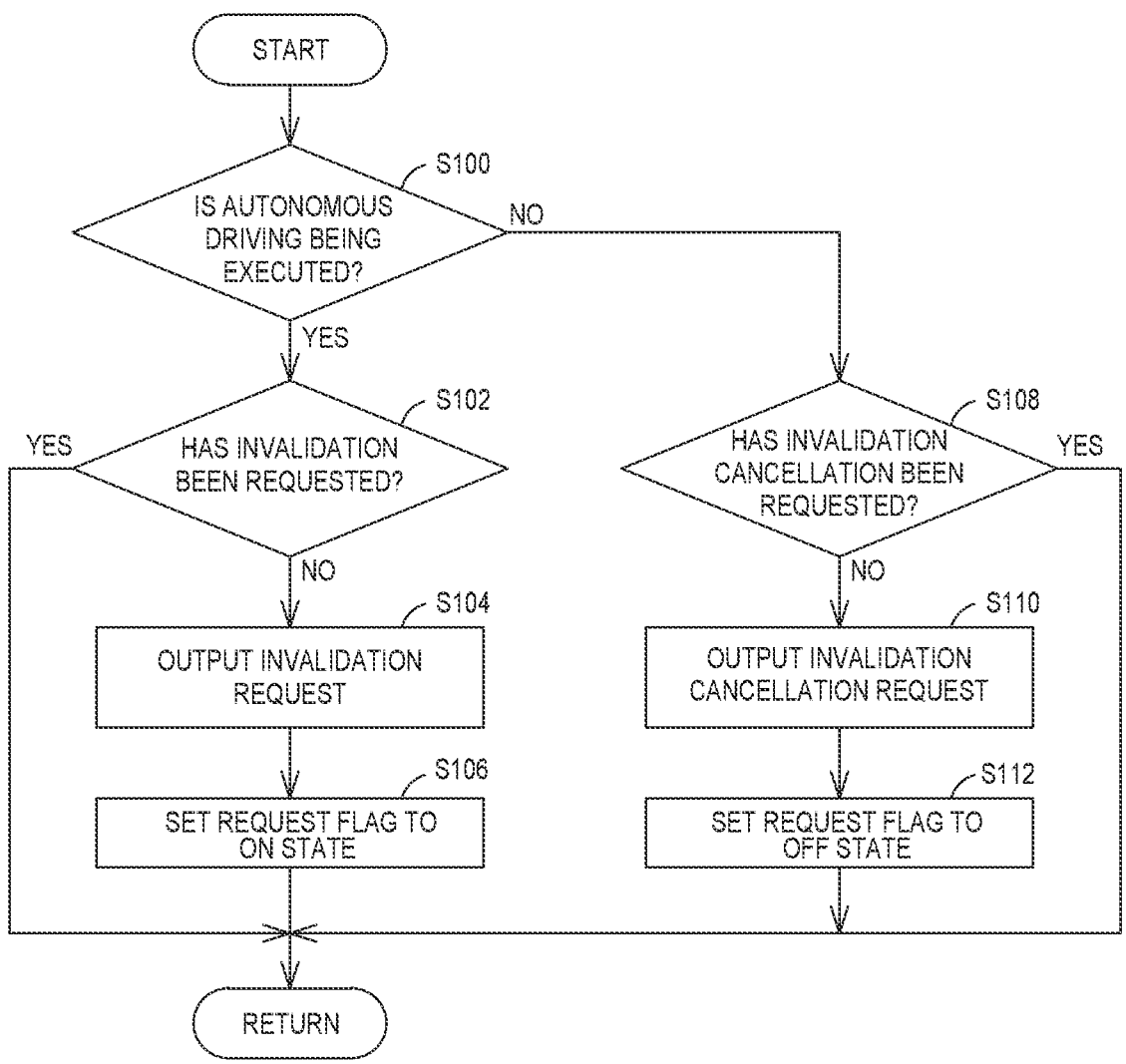
FIG. 4 is a flowchart illustrating an example of processing executed in an autonomous driving system (ADS)

Hereinafter, processing executed in the ADS 122 of the ADK 120 will be described with reference to FIG. 4. FIG. 4 is a flowchart illustrating an example of the processing executed in the ADS 122.

At step (hereinafter, step is referred to as S) 100, the ADS 122 determines whether the autonomous driving is being executed. When the autonomous driving is started by, for example, an operation executed by an occupant of the vehicle 1 or remote control, the ADS 122 sets a flag to an ON state. Further, when the autonomous driving is stopped by, for example, an operation or the like, the ADS 122 sets the flag to an OFF state. When the flag is in the ON state, the ADS 122 determines that the autonomous driving is being executed. When the ADS 122 determines that the autonomous driving is being executed (YES in S100), the process proceeds to S102.

In S102, the ADS 122 determines whether the invalidation has been requested. When a request flag described below is in the ON state, the ADS 122 determines that the invalidation has been requested. On the other hand, when the request flag is in the OFF state, the ADS 122 determines that the invalidation has not been requested. When the ADS 122 determines that the invalidation has been requested (YES in S102), the process ends. On the other hand, when the ADS 122 determines that the invalidation has not been requested (NO in S102), the process proceeds to S104.

In S104, the ADS 122 outputs an invalidation request to the motion manager 200. Since the invalidation request is described above, detailed description thereof will not be repeated.

In S106, the ADS 122 sets the request flag to the ON state. Thereafter, the process ends. On the other hand, when the ADS 122 determines that the autonomous driving is not being executed (NO in S100), the process proceeds to S108.

In S108, the ADS 122 determines whether an invalidation cancellation has been requested. When the request flag is in the OFF state, the ADS 122 determines that the invalidation cancellation has been requested. On the other hand, when the request flag is in the ON state, the ADS 122 determines that the invalidation cancellation has not been requested. When the ADS 122 determines that the invalidation cancellation has been requested (YES in S108), the process ends. On the other hand, when the ADS 122 determines that the invalidation cancellation has not been requested (NO in S108), the process proceeds to S110.

In S110, the ADS 122 outputs, to the motion manager 200, an invalidation cancellation request requesting to cancel the invalidation of a part (that is, a function of the PCS 110) of a driver assistance function.

In S112, the ADS 122 sets the request flag to the OFF state. Thereafter, the process ends.

Figure 5:
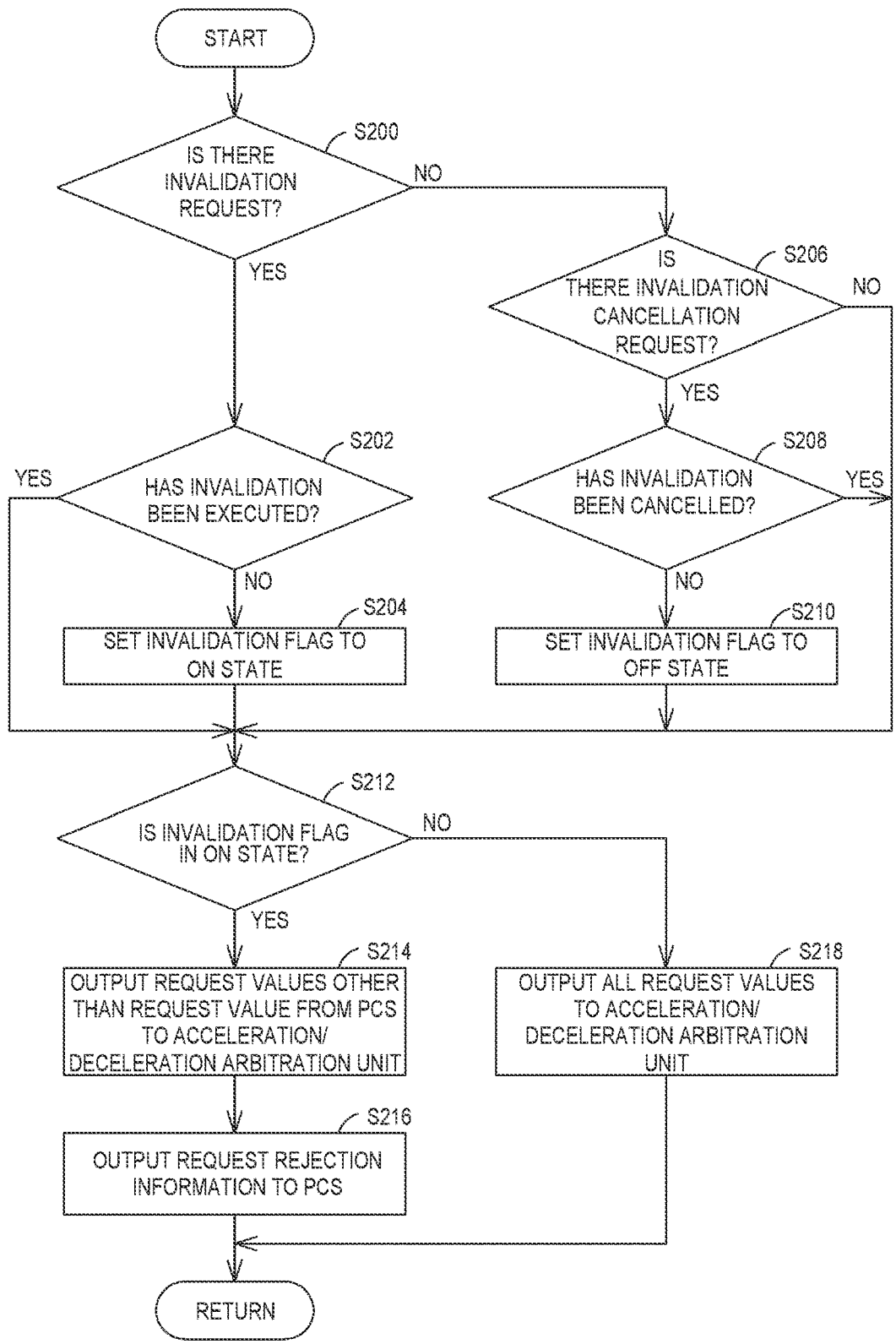
FIG. 5 is a flowchart illustrating an example of processing executed in an invalidation processing unit.

Next, processing executed in the motion manager 200 (more specifically, the invalidation processing unit 204a) will be described with reference to FIG. 5. FIG. 5 is a flowchart illustrating an example of the processing executed in the invalidation processing unit 204a.

In S200, the invalidation processing unit 204a determines whether there is the invalidation request. When, for example, the invalidation request is input from the ADS 122, the invalidation processing unit 204a determines that there is the invalidation request. When the invalidation processing unit 204a determines that there is the invalidation request (YES in S200), the process proceeds to S202.

In S202, the invalidation processing unit 204a determines whether the invalidation has been executed. When, for example, an invalidation flag indicating that the part (that is, the function of the PCS 110) of the driver assistance function is in an invalidated state is in the ON state, the invalidation processing unit 204a determines that the invalidation has been executed. On the other hand, when, for example, the invalidation flag is in the OFF state, the invalidation processing unit 204a determines that the invalidation has not been executed. When the invalidation processing unit 204a determines that the invalidation has not been executed (NO in S202), the process proceeds to S204.

In S204, the invalidation processing unit 204a sets the invalidation flag to the ON state. Thereafter, the process proceeds to S212. On the other hand, when the invalidation processing unit 204a determines that there is no invalidation request (NO in S200), the process proceeds to S206.

In S206, the invalidation processing unit 204a determines whether there is the invalidation cancellation request. When, for example, the invalidation cancellation request is input from the ADS 122, the invalidation processing unit 204a determines that there is the invalidation cancellation request. When the invalidation processing unit 204a determines that there is the invalidation cancellation request (YES in S206), the process proceeds to S208.

In S208, the invalidation processing unit 204a determines whether the invalidation has been canceled. When, for example, the invalidation flag is in the OFF state, the invalidation processing unit 204a determines that the invalidation has been canceled. On the other hand, when, for example, the invalidation flag is in the ON state, the invalidation processing unit 204a determines that the invalidation has not been canceled. When the invalidation processing unit 204a determines that the invalidation has not been canceled (NO in S208), the process proceeds to S210.

In S210, the invalidation processing unit 204a sets the invalidation flag to the OFF state. Thereafter, the process proceeds to S212. On the other hand, when the invalidation processing unit 204a determines that the invalidation has been executed (YES in S202), determines that there is no invalidation cancellation request (NO in S206), or determines that the invalidation has been canceled (YES in S208), the process proceeds to S212.

In S212, the invalidation processing unit 204a determines whether the invalidation flag is in the ON state. When the invalidation processing unit 204a determines that the invalidation flag is in the ON state (YES in S212), the process proceeds to S214.

In S214, the invalidation processing unit 204a outputs, to the acceleration/deceleration arbitration unit 204b, request values for acceleration/deceleration other than the request value from the PCS 110. In other words, the invalidation processing unit 204a outputs, to the acceleration/deceleration arbitration unit 204b, request values for acceleration/deceleration from the AD 124 and the ISA 112. When the invalidation processing unit 204a determines that the invalidation flag is in the OFF state (NO in S212), the process proceeds to S218.

In S216, the invalidation processing unit 204a outputs, to the PCS 110, request rejection information indicating that the kinematic plan set in the PCS 110 is invalidated.

In S218, the invalidation processing unit 204a outputs, to the acceleration/deceleration arbitration unit 204b, all the request values for the acceleration/deceleration, which include the request value from the PCS 110.

An example of the operation of the vehicle 1 based on the structure and the flowcharts as above will be described with reference to FIG. 6. FIG. 6 is a diagram for describing an example of the operation of the vehicle 1. Since the configurations of the system group 150 and the motion manager 200 of FIG. 6 are the same as those of the system group 150 and the motion manager 200 of FIG. 3, detailed description thereof will not be repeated.

For example, it is assumed that the vehicle 1 is in a manual driving state where it is manually driven. At this time, both the request flag and the invalidation flag are in the OFF state.

Upon determining that the autonomous driving is not being executed (NO in S100), the ADS 122 determines whether the invalidation cancellation has been requested (S108). At this time, when the manual driving state is continued, the request flag remains in the OFF state. For this reason, the determination that the autonomous driving is not being executed (NO in S100) and the determination that the invalidation cancellation has been requested (YES in S108) are repeated.

At this time, since there is no invalidation request (NO in S200) and there is no invalidation cancellation request (NO in S206) in the invalidation processing unit 204a, the invalidation flag is in the OFF state (NO in S212). Thus, all the request values are output from the invalidation processing unit 204a to the acceleration/deceleration arbitration unit 204b (S218).

On the other hand, for example, when the autonomous driving of the vehicle 1 is started in the ADS 122 by the operation executed by the occupant or the remote control, the ADS 122 determines that the autonomous driving is being executed (YES in S100), and determines whether the invalidation has been requested (S102). At this time, since the request flag is in the OFF state, the ADS 122 determines that the invalidation has not been requested (NO in S102). For this reason, the invalidation request is output to the motion manager 200 (S104), and the request flag is set to the ON state (S106). When the autonomous driving is continued, the request flag remains in the ON state. For this reason, the determination that the autonomous driving is being executed (YES in S100) and the determination that the invalidation has been requested (YES in S102) are repeated.

When the invalidation request is input from the ADS 122, the invalidation processing unit 204a determines that there is the invalidation request (YES in S200), and determines whether the invalidation has been executed (S202). Since the invalidation flag is in the OFF state, the invalidation processing unit 204a determines that the invalidation has not been executed (NO in S202), and the invalidation flag is set to the ON state (S204).

When the invalidation flag is turned to the ON state (YES in S212), as represented by the dashed arrow in FIG. 6, the kinematic plan from the PCS 110 is invalidated and the request values for acceleration/deceleration other than the request value from the PCS 110 are output to the acceleration/deceleration arbitration unit 204b (S214). For this reason, the request value for acceleration/deceleration from the PCS 110 is restricted from being selected in the acceleration/deceleration arbitration unit 204b. Then, as represented by a fine solid arrow B of FIG. 6, the request rejection information is output to the PCS 110 (S216). For this reason, making a determination that an abnormality has occurred because the kinematic plan set in the PCS 110 is not selected is restricted.

Thereafter, when the autonomous driving of the vehicle 1 is stopped in the ADS 122 by the operation executed by the occupant or the remote control, the ADS 122 determines that the autonomous driving is not being executed (NO in S100), and determines whether the invalidation cancellation has been requested (S108). At this time, since the request flag is in the ON state, the ADS 122 determines that the invalidation cancellation has not been requested (NO in S108). For this reason, the invalidation cancellation request is output to the motion manager 200 (S110), and the request flag is set to the OFF state (S112). When a stopped state (the manual driving state) of the autonomous driving is continued, the request flag remains in the OFF state. For this reason, the determination that the autonomous driving is not being executed (NO in S100) and the determination that the invalidation cancellation has been requested (YES in S108) are repeated.

When the invalidation cancellation request is input from ADS 122, the invalidation processing unit 204a determines that there is no invalidation request (NO in S200), and determines that there is the invalidation cancellation request (YES in S206). At this time, since the invalidation flag is in the ON state, the invalidation processing unit 204a determines that the invalidation has not been canceled (NO in S208), and the invalidation flag is set to the OFF state (S210).

When the invalidation flag is turned to the OFF state (NO in S212), all the request values are output from the invalidation processing unit 204a to the acceleration/deceleration arbitration unit 204b (S218).

As described above, with the motion manager 200 according to the present embodiment, since the kinematic plan set in the PCS 110 is invalidated by the invalidation request during the autonomous driving, it is possible to restrict the execution of the kinematic plan set in the ADS 122 from being hindered by the kinematic plan set in the PCS 110. For this reason, it is possible to restrict the interference of functions between the ADS 122 and a part of the driver assistance system 100, and control the vehicle 1 based on the kinematic plan set in the ADS 122 such that a series of operations are realized. Therefore, it is possible to provide a motion manager, an autonomous driving apparatus, a control system, a vehicle, a control method of the vehicle, and a non-transitory storage medium that appropriately set kinematic plans on driver assistance of the vehicle.

Further, the kinematic plan set in the ISA 112 is not invalidated. The ISA 112 is a system, different from the PCS 110, from among the plurality of systems set in the driver assistance system 100. For this reason, when, for example, the ISA 112 is set to comply with a law, it is possible to restrict the kinematic plan set in the ISA 112 from being invalidated.

Hereinafter, modified examples will be described. In the above-described embodiment, it has been described that the request information includes information requesting invalidation of the kinematic plan set in the PCS 110. However, the request information is at least information indicating that the first kinematic plan set in the AD 124 is prioritized over the second kinematic plan set in the PCS 110, and is not particularly limited to the information requesting to invalidate the second kinematic plan set in the PCS 110. For example, the request information may include information indicating that the first kinematic plan set in the AD 124 has a higher priority than the second kinematic plan set in the PCS 110. In this manner, it is possible to restrict the execution of the first kinematic plan set in the AD 124 from being hindered by the second kinematic plan set in the PCS 110.

Further, in the above-described embodiment, it has been described that the invalidation processing unit 204a of the arbitration unit 204 outputs, to the PCS 110, the request rejection information indicating that the kinematic plan from the PCS 110 is invalidated during the autonomous driving. However, for example, information on the invalidation request, such as information indicating that the invalidation request is input from the AD 124, may be output to the PCS 110. Since the PCS 110 receives an input of such information, it is possible to prevent the PCS 110 from being determined to be in the abnormal state even when a state where the kinematic plan input from the PCS 110 is invalidated in the invalidation processing unit 204a and the kinematic plan set in the PCS 110 is not selected in the arbitration unit 204 is continued.

Further, in the above-described embodiment, it has been described that the invalidation processing unit 204a invalidates the kinematic plan set in the PCS 110 when the ADS 122 outputs the invalidation request to the motion manager 200 during the autonomous driving. However, an application that is a target of invalidation during the autonomous driving is not limited to the PCS 110 and may be, for example, the AEB 102, the ACC 106, the ASL 108, or other applications.

Further, in the above-described embodiment, it has been described that the arbitration unit 204 includes the acceleration/deceleration arbitration unit 204b. However, the kinematic plan set in any of the applications that further include the arbitration unit which arbitrates a request value of a steering angle and the like, and output the request value of a steering angle and the like, may be a target of the invalidation. Examples of the application that outputs the request value of a steering angle and the like and is the target of the invalidation include at least one of applications that sets a kinematic plan on the steering angle, such as the LKA 104 and the LTA.

Further, in the above-described embodiment, it has been described that, when the autonomous driving is not being executed, the kinematic plan set in the PCS 110 is not invalidated by requesting for the invalidation cancellation. However, when the autonomous driving is not being executed, that is, during the manual driving, for example, the reception unit 202 may be configured to not receive the invalidation request from the AD 124. In this case, by not receiving the invalidation request from the reception unit 202, the invalidation processing unit 204a outputs the kinematic plan set in the PCS 110 to the acceleration/deceleration arbitration unit 204b without invalidating the kinematic plan set in the PCS 110.

Further, in the above-described embodiment, an example has been described where, when the ADS 122 outputs the invalidation request, the kinematic plan set in a predetermined application is invalidated. However, the application that outputs the invalidation request is not particularly limited to the ADS 122, and, for example, the kinematic plan set in at least one of the applications that include the ADS 122 may be invalidated when at least one of the applications included in the driver assistance system 100 outputs the invalidation request.

Further, in the above-described embodiment, an example has been described where the motion manager 200 includes the reception unit 202, the arbitration unit 204, the calculation unit 206, and the distribution unit 208. However, the motion manager 200 may include, for example, at least a first motion manager that receives a kinematic plan from an application and a second motion manager that is capable of communicating with the first motion manager and that requests the motion to the actuator system 30. In this case, the function of the arbitration unit 204, the function of the calculation unit 206, and the function of the distribution unit 208 are implemented in any of the first motion manager and the second motion manager.

The above-described modified examples may be executed by appropriately combining all or a part thereof. The embodiments disclosed in the present disclosure should be considered as illustrative in all points, and not be considered as limited. The scope of the present disclosure is defined by the claims, not by the above description, and is intended to include meanings equivalent to the claims and all modifications within the scope thereof.

What is claimed is:

1. An autonomous driving apparatus configured to transmit a first kinematic plan on autonomous driving to a motion manager configured to control behavior of a vehicle, the motion manager being configured to request motion of the vehicle according to a plurality of kinematic plans, set in each of a plurality of systems, on driver assistance of the vehicle to at least one of a plurality of actuators provided in the vehicle, the autonomous driving apparatus comprising a first system configured to:
set the first kinematic plan;
transmit, to the motion manager, the first kinematic plan set in the autonomous driving apparatus and request information requesting to select the first kinematic plan by prioritizing the first kinematic plan over a second kinematic plan from among the plurality of kinematic plans, such that the motion manager disregards the second kinematic plan and arbitrates the first kinematic plan with a remaining of the plurality of kinematic plans; and
cause the vehicle to be autonomously driven based on a result of arbitrating the first kinematic plan with the remaining of the plurality of kinematic plans, wherein:
the plurality of systems include the first system, and a second system mounted on the vehicle and configured to set the second kinematic plan; and
upon receiving the request information from the first system, the motion manager invalidates the second kinematic plan and outputs information to the second system indicating that the second kinematic plan from the second system is invalidated; and upon receiving said information from the motion manager, the second system restricts making a determination on whether abnormality occurs in the second system.

2. The autonomous driving apparatus according to claim 1, wherein the request information includes information requesting invalidation of the second kinematic plan set in the second system.

3. The autonomous driving apparatus according to claim 1, wherein the request information includes information requesting to give the first kinematic plan set in the first system a higher priority than the second kinematic plan set in the second system.

4. The autonomous driving apparatus according to claim 1, wherein the motion manager comprises one or more processors that are configured to arbitrate the kinematic plans according to the received request information.

5. The autonomous driving apparatus according to claim 1, wherein the motion manager comprises one or more processors that are configured to output information on the request information to the second system.

6. The autonomous driving apparatus according to claim 1, wherein the plurality of systems further include a third system that is different from the first system and the second system, and is configured to set a kinematic plan over which the first kinematic plan is not prioritized.

7. The autonomous driving apparatus according to claim 6, further comprising a storage configured to store information on at least one of the second system and the third system.

8. The autonomous driving apparatus according to claim 6, wherein:
the first system includes an autonomous driving system; and
each of the second system and the third system includes a system mounted on the vehicle.

9. The autonomous driving apparatus according to claim 6, wherein:
the first system includes an autonomous driving system; and
each of the second system and the third system includes at least one of a plurality of driver assistance systems.

10. The autonomous driving apparatus according to claim 6, wherein the third system includes a system set to comply with a law.

11. The autonomous driving apparatus according to claim 1, wherein the second system includes a system configured to assist driving of a driver of the vehicle.

12. The autonomous driving apparatus according to claim 1, wherein the motion manager includes one or more processors that are configured to receive the request information from the first system during autonomous driving of the vehicle, and to not receive the request information from the first system during manual driving of the vehicle.

13. A control system comprising:
a motion manager; and
an autonomous driving system, wherein:
the motion manager is configured to request motion of a vehicle according to a plurality of kinematic plans, set in each of a plurality of systems including the autonomous driving system, on driver assistance of the vehicle to at least one of a plurality of actuators provided in the vehicle;

the autonomous driving system is configured to:
set a first kinematic plan from among the kinematic plans;
transmit, to the motion manager, request information requesting to select the first kinematic plan by prioritizing the first kinematic plan over a second kinematic plan from among the kinematic plans, such that the motion manager disregards the second kinematic plan and arbitrates the first kinematic plan with a remaining of the kinematic plans; and
cause the vehicle to be autonomously driven based on a result of arbitrating the first kinematic plan with the remaining of the kinematic plans; and
the plurality of systems include the autonomous driving system, and a system mounted on the vehicle and configured to set the second kinematic plan; and
upon receiving the request information from the autonomous driving system, the motion manager invalidates the second kinematic plan and outputs information to the system, which is mounted on the vehicle and configured to set the second kinematic plan, indicating that the second kinematic plan from the system is invalidated; and
upon receiving said information from the motion manager, the system restricts making a determination on whether abnormality occurs in the system.

14. The control system according to claim 13, wherein the request information includes information requesting invalidation of the second kinematic plan set in the system.

15. The control system according to claim 13, wherein the request information includes information requesting to give the first kinematic plan set in the autonomous driving system a higher priority than the second kinematic plan set in the system.

16. The control system according to claim 13, wherein the motion manager comprises one or more processors that are configured to arbitrate the kinematic plans according to the received request information.

17. The control system according to claim 13, wherein the motion manager comprises one or more processors that are configured to output information on the request information to the system.

18. The control system according to claim 13, wherein the plurality of systems further include another system that is different from the autonomous driving system and the system, and is configured to set a kinematic plan over which the first kinematic plan is not prioritized.

19. The control system according to claim 18, further comprising a storage configured to store information on at least one of the system and the another system.

20. The control system according to claim 13, wherein the motion manager includes one or more processors that are configured to receive the request information from the autonomous driving system during autonomous driving of the vehicle, and to not receive the request information from the autonomous driving system during manual driving of the vehicle.

* * * * *